(12) United States Patent
Kenney

(10) Patent No.: US 6,381,583 B1
(45) Date of Patent: Apr. 30, 2002

(54) INTERACTIVE ELECTRONIC SHOPPING SYSTEM AND METHOD

(76) Inventor: John A. Kenney, 140 Lake Aluma Dr., Oklahoma City, OK (US) 73121

( * ) Notice: Subject to any disclaimer, the term of this patent is extended or adjusted under 35 U.S.C. 154(b) by 0 days.

(21) Appl. No.: 09/338,963

(22) Filed: Jun. 24, 1999

Related U.S. Application Data (63) Continuation of application No. 08/838,087, filed on Apr. 15, 1997.

(51) Int. Cl.⁷ .............................................. G06F 17/60
(52) U.S. Cl. ............................... 705/26; 705/27; 703/6
(58) Field of Search ..................... 705/26, 27; 348/7, 348/8, 13, 12; 455/5.1, 6.3, 4.2; 703/6

(56) References Cited

U.S. PATENT DOCUMENTS

| | | | | |
|---|---|---|---|---|
| 4,792,849 A | | 12/1988 | McCalley et al. ............ 358/86 |
| 4,947,028 A | * | 8/1990 | Gorog ........................ 235/380 |
| 4,984,155 A | * | 1/1991 | Geier et al. .................... 235/26 |
| 4,992,940 A | * | 2/1991 | Dworkin ...................... 705/26 |
| 5,053,956 A | | 10/1991 | Donald et al. ............... 364/401 |
| 5,119,188 A | | 6/1992 | McCalley et al. ............ 358/86 |
| 5,191,410 A | | 3/1993 | McCalley et al. ............ 358/86 |
| 5,208,665 A | | 5/1993 | McCalley et al. ............ 358/86 |
| 5,255,211 A | * | 10/1993 | Redmond ................... 364/578 |
| 5,283,731 A | | 2/1994 | Lalonde et al. ............. 364/401 |
| 5,293,529 A | * | 3/1994 | Yoshimura ................... 345/158 |
| 5,296,871 A | * | 3/1994 | Paley ........................ 345/163 |
| 5,297,061 A | * | 3/1994 | Dementhon et al. ........ 345/180 |
| 5,320,538 A | * | 6/1994 | Baum ......................... 434/307 |
| 5,325,297 A | | 6/1994 | Bird et al. ............. 364/419.07 |

(List continued on next page.)

FOREIGN PATENT DOCUMENTS

EP            0694833 A1 *  1/1996

OTHER PUBLICATIONS

"Food Service and the Web"; National Restaurant News, New York, Oct. 1996.*

Milford; "Adventurous restaurateurs spin onto the internet"; Nation's Restaurant News; Dialog File 15, Accession No. 01165954, Feb. 1996.*

Dialog File 148, Account No. 06199272: Carr "Is virtual reality here." Training & Development, v46, n10, p36(6), Oct. 1992.*

Dialog file 636, Account No. 01898063: Bothwell"New For P.C.: Autodesk's 3D Home Design" NewsWire, General Trade, Sep. 1992.*

Dialog File 9, Account No. 01189008: "American Greetings' New Science (American Greetings uses virtual reality technology in Tiny Town to custom design store display)." Supermarket News, v 45, n 19, ,p 134, May 1995.*

Dialog File 275, account No. 01390558: Jonathan "Virtus Walkthrough," 3D, n31, p17(2), Nov. 1990.*

"Update On Interactive Videodisk Kiosks", Meckler Corp., Information Access Co; Dialogue: File 636, Acct #00528903, Jun. 1, 1988.*

(List continued on next page.)

*Primary Examiner*—Tariq R. Hafiz
*Assistant Examiner*—Romain Jeanty
(74) *Attorney, Agent, or Firm*—McAfee & Taft (57) ABSTRACT

An interactive electronic shopping system and method create a virtual shopping facility from an actual shopping facility, such as a grocery store, restaurant, or office. A shopper at a computer or other suitable display device can move through the virtual shopping facility and see replicas of what would be seen in moving through the actual shopping facility. Various lists of items selected for purchase can be made, and predetermined lists and information can be displayed. Changes in the actual shopping facility, such as a change in a display of goods, can be accommodated by replacing prior data with new data so that the virtual shopping environment is kept current with the actual shopping facility.

7 Claims, 7 Drawing Sheets

U.S. PATENT DOCUMENTS

| | | | |
|---|---|---|---|
| 5,329,276 A | * 7/1994 | Hirabayashi | 340/870.31 |
| 5,347,632 A | 9/1994 | Filepp et al. | 395/200 |
| 5,351,186 A | * 9/1994 | Bullock et al. | 705/1 |
| 5,381,158 A | * 1/1995 | Takahara et al. | 345/156 |
| 5,442,734 A | * 8/1995 | Murakami et al. | 395/427 |
| 5,451,998 A | 9/1995 | Hamrick | 348/13 |
| 5,453,758 A | * 9/1995 | Sato | 345/158 |
| 5,479,491 A | 12/1995 | Herrero Garcia | 379/88 |
| 5,590,062 A | * 12/1996 | Nagamitsu | 364/578 |
| 5,661,517 A | * 8/1997 | Budow et al. | 348/13 |
| 5,664,110 A | * 9/1997 | Green et al. | 705/26 |
| 5,724,492 A | * 3/1998 | Matthews, III et al. | 395/119 |
| 5,754,940 A | * 5/1998 | Smith et al. | 455/5.1 |
| 5,760,838 A | * 6/1998 | Adams et al. | 348/460 |
| 5,761,606 A | * 6/1998 | Wolzien | 455/6.2 |
| 5,761,649 A | * 6/1998 | Hill | 705/27 |
| 5,808,614 A | * 9/1998 | Nagahara et al. | 345/355 |
| 5,845,263 A | * 12/1998 | Camaisa et al. | 705/27 |
| 5,848,399 A | * 12/1998 | Burke | 705/27 |
| 5,948,040 A | * 9/1999 | DeLorme et al. | 701/201 |
| 6,026,376 A | * 2/2000 | Kenney | 705/26 |
| 6,038,545 A | * 3/2000 | Mandeberg et al. | 705/15 |

OTHER PUBLICATIONS

Scott et al., "Shopping motives, emotional states, and retail outcomes."; Journal of Retailing, v66, p. 408(20); Dialogue: File 148, Acct #04913422, Dec. 1990.*

Renee Covino, "Multimedia Technology: Systes for the Senses"; Journal article, 3 pages; Dialogue: File 15, Acct #00609538, Apr. 1992.*

Paul, "Stores without doors: Kiosks generate new profits"; Corporate Computing, v1, n4, p193(3); Dialogue: File 275, Acct #01537785, Oct. 1992.*

Frederickson, "Investigations in Virtual Reality", p(1), Apr. 1993.*

Frederickson, "Investigations in Virtual Reality", School of Architecture University of California, San Diego, May 1993.*

Frederickson, "The Architect, Consumerism and the Virtual", Dec. 1993.*

Boyd–Merit, "AT&T backs shopping–software Venture"; Electronic Engineering Times; p. 14; Dialogue: File 16, Acct #04824863, Dec. 1993.*

"EShop: eShop on computers, television and personal communication devices; eShop offers first electronic shopping technology that allows merchants to create exciting, personalized shopping experiences for consumers"; Business Editors & Computers/Electron, Dec. 1993.*

A Virtual Shopping Mall: Coming soon to the crossroads of the Infobahn, Mar. 1994.*

Mestel, "Is Cyber Shopping in the bag?", Jun. 1994.*

Hamit, "Imaging's Reality Invades Virtual Reality for New Apps", SIGRAPH'94 and Mac World Boston, Jul. 1994.*

Kate Deely, "Virtual reality mall may save shoe leather", La Jolla Light, Aug. 1994.*

Mestel, "Is Cyber Shopping in the bag?", Nov. 1994.*

"Cash in: The rush is on to buy and sell on the internet"; Advertising Age, p. 11; Dialogue: File 16, Acct #05419137, Dec. 1994.*

Hickey; "Shopping at home"; Home PC; n 00, p307; Dialogue: File 647, Acct #010381623, Dec. 1994.*

Arlen; "CyberSelling: Shopping comes to the web To launch Internet service via the World Wide Web"; Response TV, p. 26; Dialogue: File 16, Acct #05681939, Jul. 1995.*

"Media features: Peapod's vision"; Financial Times(London), p. 15; Dialogue: File 16, Acct #05852024, Dec. 1995.*

"Thomas Unveils Online Processing Network (Thomas Publishing introduces Connects electronic corporate purchasing network for industrial products", Electronic Buyers News, p.60; Dialogue file 9, Acct. No. 01355145. Thomas Unveils Online Processing Networ, Dec. 1995.*

Bethoney, "Made to order for online catalogs (i Cat's Electronic commerce suite . . . )", PC Week, vol. 13, No. 45, p.80(1), Dialogue file 47, Acct. No. 04634978, Nov. 1996.*

"Update On Interactive Videodisk Kiosks", Meckler Corp., Information Access Co.; Dialogue: 636, Acct #00528903 (Jun. 1, 1988).

Scott Dawson et al., "Shopping motives, emotional states, and retail outcomes."; Journal of Retailing, v66, p. 408(20); Dialogue: File 148, Acct #04913422 (Dec. 1990).

Renee Covino Rouland, "Multimedia Technology: Systems for the Senses"; Journal article, 3 pages; Dialogue: File 15, Acct #00609538, Apr. 1992.

Paul Bandrowski, "Stores without doors: Kiosks generate new profits"; Corporate Computing, v1, n4, p193(3); Dialogue: File 275, Acct #01537785 (Oct. 1992).

Frederickson, "Investigations in Virtual Shopping", p(1). (Apr. 1993).

Frederickson, "Investigations in Virtual Shopping", School of Architecture, University of California, San Diego. (May 1993).

Frederickson, "The Architect, Consumerism and the Virtual" (Dec. 1993).

"EShop: eShop on computers, television and personal communication devices; eShop offers first electronic shopping technology that allows merchants to create exciting, personalized shopping experiences for consumers"; Business Editors & Computers/Electronic Writers (Dec. 1993).

Webster, "A shopper's virtual paradise"; Computer Graphics World, v17, n8, p13(3); Dialogue: File 275, Acct #01703788 (Aug. 1994).

"Cashing in: The rush is on the buy and sell on the Internet"; Advertising Age, p. 11; Dialogue: File 16, Acct #05419137 (Dec. 1994).

Hickey; "Shopping at home: one modem line; no waiting"; Home PC; n 00, p. 307; Dialogue: File 647, Acct #01038162 (Dec. 1994).

"Media futures: Peapod's vision"; Financial Times (London), p. 15; Dialogue: File 16, Acct #05852024, (Dec. 1995).

"Thomas Unveils Online Processing Network (Thomas Publishing introduces ConnectsUS electronic corporate purchasing network for industrial products", Electronics Buyers News, p. 60; Dialogue file 9, Acct. No. 01355145. (Dec. 1995).

"Wired for Interactivity," IEEE Spectrum, Apr. 1996, p. 21.

"The trials and travails of Interactive TV," IEEE Spectrum, Apr. 1996, pp. 22–28.

"Interactive Media: An Internet reality," IEEE Spectrum, Apr. 1996, pp. 29–32.

Bethoney, "Made to order for online catalogs (iCat's Electronic commerce suite . . . )", PC Week, vol. 13, No. 45, p.80(1); Dialogue File 47, Acct. No. 04634978. (Nov. 1996).

* cited by examiner

INTERACTIVE ELECTRONIC SHOPPING SYSTEM AND METHOD

This application is a continuation of copending application Ser. No. 08/838,087 filed on Apr. 15, 1997.

BACKGROUND OF THE INVENTION

This invention relates generally to interactive electronic shopping systems and methods and more particularly, but not by way of limitation, to such systems and methods utilizing the Internet so that an individual shopper can access shopping information from his or her home or office, for example.

Commercial use of the Internet, and particularly the World Wide Web, presently allows some degree of investigation and ordering of products offered for sale. The convenience that this can offer to a shopper would be enhanced with regard to at least some types of shopping if the shopper could see a virtual reproduction of an actual store and the products offered there as they are actually displayed at the store. Convenience would also be enhanced if the shopper could examine the displayed products in a manner similar to how one would at the actual store.

Further convenience would be added by creating one or more lists of what the shopper may need to buy based upon historical or predetermined ordering patterns or upon actual selections at the time the shopper is moving through the virtual store shown on the shopper's display.

Thus, there is the need for a video-based digitally implemented interactive electronic shopping system which allows a customer to view the contents of a particular shopping facility in a format that provides the feeling of shopping for the items in that particular facility. Use of this should be available at the customer's home or business through a convenient device, such as a personal computer, television or other consumer type electronic visual display device.

SUMMARY OF THE INVENTION

The present invention provides a novel and improved interactive electronic shopping system and method that satisfy the aforementioned needs for making shopping more convenient to the shopper. Using the present invention, a shopper can browse through a virtual duplicate of an actual store in a manner similar to being in the actual store itself. The shopper can examine individual products, and select or not select ones for purchase. Through the selection process, one or more types of lists can be created (e.g., alphabetical or by location in the store). Historical lists based on past ordering and predetermined buying frequency can also be provided. Special displays or information can also be provided to alert the shopper to specials on particular products. Products can be located through a directory that correlates all the products with their respective locations in the store. Changes at the actual store can be implemented in the virtual store.

This invention benefits the marketer of the products because, for example, it allows for customer loyalty to be developed since the exact depiction of the marketer's store actually enables the customer to become very familiar with the store and its particular products and to stay abreast of changes. It also enables a customer to reduce the actual shopping time and to ease or enhance the shopping experience.

An interactive electronic shopping system of the present invention comprises: means for converting images of a shopping facility into encoded digital signals representing the images as would be seen by a shopper at a physical embodiment of the shopping facility; means for storing the encoded digital signals in a computer data base; means for displaying a video representation of the shopping facility in response to the stored encoded digital signals; and control means for the shopper to control the means for displaying such that the means for displaying causes the displayed video image to change at the shopper's command to correspond to what the shopper would see were the shopper to move through a physical embodiment of the shopping facility.

In a particular implementation, the interactive electronic shopping system comprises: a digital camera to digitize a shopping facility into digital signals representing images of the shopping facility; a central computer data base to store the digital signals; a communication link connected to the central computer data base; a local computer connected to the communication link; and a control interface connected to the local computer to enable a shopper to control the local computer such that the local computer obtains data from the central computer data base in response to the digital signals stored therein and displays video images of the shopping facility in response to the obtained data.

The present invention also provides a method of creating a virtual shopping facility for interactive shopping by computer. This method comprises: selecting a physically embodied shopping facility in which a shopper can purchase from among a plurality of products; converting images of at least a portion of the shopping facility and the plurality of products into encoded digital signals; storing the encoded digital signals in a computer storage medium; and providing access to the stored encoded digital signals such that portions of the stored encoded digital signals are selectable and transmissible to a computer for displaying, on a monitor of the computer, virtual movement within a visual representation of the shopping facility and for permitting examination of visual representations of selected products in response to selected stored encoded digital signals.

The present invention also provides a computer-implemented method of simulating movement of a shopper through a shopping facility to enable an individual to observe, inspect and select a product in the shopping facility through operation of a computer. The method comprises: selecting a shopping facility having a known configuration of products displayed at the selected shopping facility such that a shopper can move among the displayed products to observe, inspect and select from among the displayed products; simulating the configuration of displayed products in a computer, including translating the known configuration of displayed products into encoded configuration-defining electrical signals in memory of a first computer and using the electrical signals to create in a second computer video representations of the configuration of displayed products; indicating to at least the second computer a first position of a shopper in the shopping facility and displaying through a monitor of the second computer the video representation of the configuration of displayed products at the first position; and indicating to at least the second computer a continuous change from the first position to a second position and displaying through the monitor of the second computer a changing video representation of the configuration of displayed products corresponding to a moving scene the shopper would see in moving from the first position to the second position in the shopping facility.

The present invention still further provides a computer-implemented method of making a shopping list for purchasing products from a shopping facility, comprising performing each of the following steps using a computer: accessing a predetermined data base of encoded electrical signals representing a shopping facility and products available for purchase from the shopping facility; retrieving from the data base a sequence of the encoded electrical signals and displaying moving images of at least a portion of the shopping facility and products to simulate movement through the portion of the shopping facility in response to the retrieved sequence of encoded electrical signals; and selecting displayed products and making a list of the selected displayed products.

Therefore, from the foregoing, it is a general object of the present invention to provide a novel and improved interactive electronic shopping system and method. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 9 is a representation of a still further illustrative screen display at the local computer represented in FIG. 3.

DETAILED DESCRIPTION OF THE INVENTION

Overview

A digital camera provides an inexpensive and versatile way for a store owner to electronically capture images of the store's contents for computerized interactive viewing by its customers. The present invention uses this to enable a viewer of a display screen to visually proceed through a virtual embodiment of the store in a fashion similar to walking up and down aisles at the actual store. The viewer can view items on each aisle with the ability to move closer to read images of actual labels on products on shelves or in displays. The digitization of the images generates electronically stored data that allows for efficient substitution of new images if products are moved or changed in a store. Items that the store chooses to highlight, such as for "sale" or "special" items, can flash or otherwise be made distinctive as the customer approaches them on the virtual journey through the displayed store.

"Hot spots" are imposed upon the display screen, such as at the location of the store price label for a particular product or at a logical location before a display of one particular group of items. By "mouse" double click or touch of an indicator on the hot spot, for example, a portion of the screen displays additional information concerning the item.

The additional information concerning an item includes any information desired. Examples are product size, price, unit price, last purchase date, location in the store, additional product advertisement including audio information, information concerning other sizes or related products available and a "yes" or "no" to order or place an item on a list. From the running list of items selected for purchase, additional lists can be automatically created. One such list could include a list of items ordered with the cost of each, the running total cost, and store location. A list arranged in order of store location could be selected for use in speeding time required for obtaining the items while in the actual store. If the order is to be filled by another party, the list could order the items for selecting from a warehouse or other storage location. Items which must be weighed or selected on a weight basis could be estimated based upon prior purchase history. Unique items such as flowers or vegetables could be ordered by category, number, and total cost or amount required (if applicable).

Additional lists can be automatically available at the beginning of the interactive virtual shopping session. These include pre-prepared lists of items routinely purchased, items purchased in the past, and items due for reorder based on prior purchase history.

One purpose of this invention is to allow persons that cannot or do not want to visit a store to send an order electronically to a store where personnel will select the items and either deliver them or hold them for pick up by the customer. Automatic electronic payment capability is preferably also available as a part of the order process.

The present invention enables pre-shopping of a particular store in the comfort of one's home, office or any location where a suitable electronic interface. (e.g., a computer having Internet access capability) is available. The information can be searched, selected and lists prepared for use while in the store, thereby reducing the shopping time. It also allows someone unfamiliar with the particular customer's desires or unfamiliar with the store to efficiently do the actual shopping using the lists produced.

This invention has particular application to any provider of goods or services where customers, clients or patients typically go to an actual shop, office or other physical facility. It is especially applicable to any merchandiser of consumer products including grocery stores, mass merchandisers of consumer goods such as variety or department stores, drug stores and other similar stores selling many items. Another specific application would allow a person to have the visual experience of walking into a restaurant, sitting down at a table, opening up a menu and ordering as if the person were in the restaurant. The order could be electronically transmitted for preparation for "carry out" or "delivery." The restaurant could create a video image of each of its menu items for display upon activation of a particular "hot spot" on the viewed menu. Unless otherwise stated or limited by a particular stated context, the terms "shopping facility" and "store" as used in this specification and the accompanying claims encompass all such places to which the present invention is applicable. The term "shopper" refers to a user of the present invention.

Preferred Embodiments of System and Method

Figure 1:
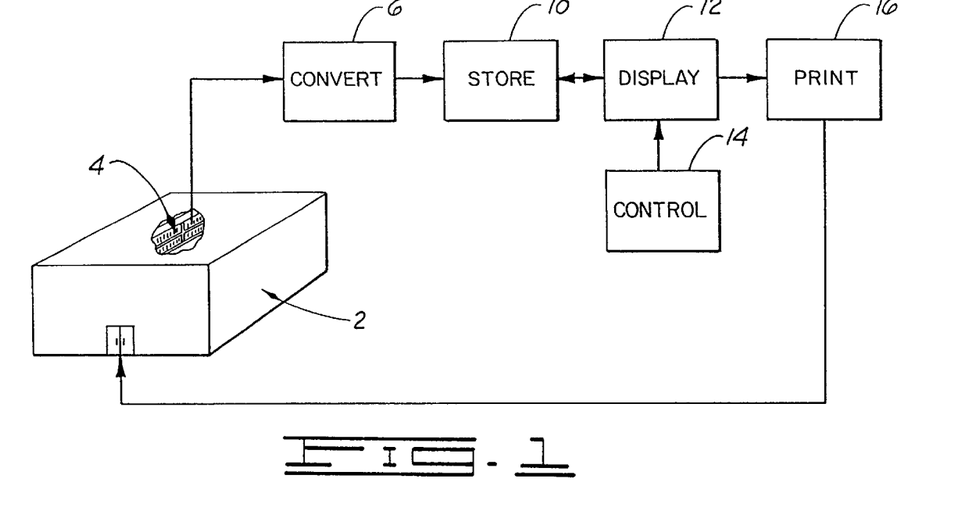
FIG. 1 is a block diagram of the preferred embodiment system of the present invention.

An electronic shopping system in accordance with the present invention is represented in FIG. 1. The system creates an electronically produced, electronically transmissible visual replica of a display of goods or other objects at a shopping facility or other particular environment. The shopping facility is conveyed to a shopper through the present invention as a specific shopping environment to be met when the shopper is actually at the facility. This expedites the shopper moving through the actual facility because the shopper has familiarity with it. Any type of environment may be depicted; however, the present invention will be specifically described with reference to a conventional grocery store 2 having conventional aisles stocked with typical products 4. It is to be noted, however, that other items, such as business cards, product brochures, business information, machines, personnel, meeting or examination rooms, etc., can be depicted.

The electronic shopping system of the present invention includes means 6 for converting images of the shopping facility into encoded digital signals representing the images as would be seen by the shopper at the physical embodiment of the shopping facility. The image converting means 6 can be used to provide any desired view that will produce a desired video replica of the shopping facility, particularly the interior environment and products of the facility. For example, the image converting means 6 can be used to generate electrical signals from which these features can be depicted at a distance for a broader view or close up to provide sufficient clarity to read significant product labeling.

Figure 2:
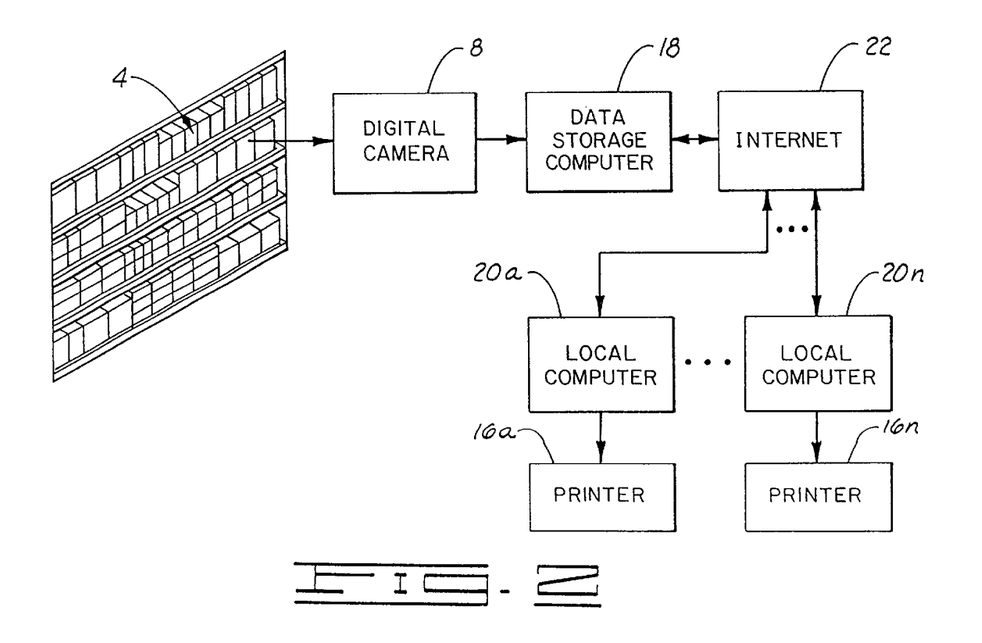
FIG. 2 is a block diagram of a particular implementation of the preferred embodiment system of the present invention.

A particular implementation of the image converting means 6 is a digital camera 8 shown in FIG. 2. This can be a conventional known type of product that generates, in response to the received light emitted or reflected from the shopping facility features, digital signals representing these detected images of the shopping facility. The image converting means 6 can be implemented in other ways, such as by a scanner device using a pictorial representation of the shopping facility or by a computer operator using a known type of graphics program to create images on a computer (e.g., the computer operator could draw an image based on a picture of an actual location or based on an artist's rendering, or as a fictitious place if actual shopping by the user is not to occur). It is preferred, however, to use a digital camera as illustrated in FIG. 2 so that a substantially exact representation of the actual facility can be quickly obtained and ultimately displayed in the electronic shopping system of the present invention. Known types of photographic (e.g., telescopic lensing) or digital imaging techniques can be used in creating long range or close up views with desired detail.

The electric signals from the image conversion means 6 are stored in a suitable storage means 10 preferably forming part of a computer data base. The storage means 10 can be implemented in any suitable manner, such as by one central memory or multiple distributed memories, or individual memories (e.g., diskettes or CD-ROMs provided to the shoppers for their individual use at home or business). The storage means 10 of whatever type is used within the system such that data can be removed and replaced as changes are made in the actual facility 2.

The data from the storage means 10 is used to provide a video representation of the shopping facility as presented through a display means 12 as represented in FIG. 1. The display means 12 includes a video monitor of any suitable type, such as a computer monitor or a television screen, in conjunction with other conventional hardware and software that allow the downloading and use of the data from the storage means 10 in the display means 12. The information downloaded can be downloaded all at one time or incrementally as specifically required. Visible images can be displayed either as still or moving images. Moving images are used to give the shopper at the display means 12 the sense of moving through the aisles of products in the grocery store 2 example.

The display means 12 is programmed to also include means for communicating information about the selected product to the shopper. This information communicated includes ordering information as well as other information as will become apparent below. The information communicated is information that has been previously entered into the data base of the storage means 10. The information can be conveyed audibly through speakers forming part of the display means 12 or visibly through the aforementioned monitor or other display device of the display means 12.

The display means 12 also includes means for generating and displaying one or more lists of products ordered. These lists can be provided in alphabetical order, or in a sequence according to the locations of the ordered products in the shopping facility so that the shopper can go to the actual facility and efficiently and expeditiously move through the facility to obtain the items to be purchased. The lists can be organized in any other suitable manner as well.

Another type of list that can be provided by the means for generating and displaying a list of the present invention is a list of products previously ordered by the shopper and the date each listed product was last ordered by the shopper. This type of list can also indicate the frequency with which each listed product has been ordered or is to be ordered by the shopper. One implementation of this is to program the display means 12 so that actual ordering or selecting of products is automatically tracked and a frequency computation made, such as either on the basis of the time since last ordering the same product or an average time based on a historical record of the orders for the same product. These lists are generated and displayed by suitable programming means within the display means 12 or as obtained from the storage means 10.

The display means 12 can also display selected images that are visually distinctive relative to the video representations of other images to highlight these images to the shopper at the display means 12. For example, certain products that are on "special" at the grocery store 2 might flash on the display screen of the display means 12. Alternatively, there might be a text indication noting that such product is on special. Such distinctive display can be applied for other purposes, examples of which include goods that may need to be reordered, items that have been selected for current purchase, etc. This feature of distinctive display is implemented by means for modifying the respective encoded digital signals of the selected images so that the video representations of these selected images displayed by the display means 12 are visually distinctive to the video representations of other images not represented by modified encoded digital signals. The modification can be implemented by the tagging or linking technique referred to below whereby the programming commands which cause the image to flash or the "special" notification text to appear are linked with the respective signals defining the respective product image.

The electronic shopping system shown in FIG. 1 also includes control means 14 for the shopper to control the display means 12 such that the display means 12 causes the displayed video image to change at the shopper's command to correspond to what the shopper would see were the shopper to move through the physical embodiment of the shopping facility 2. This includes a suitable interface device such as a mouse, keyboard, light pen, or touch screen function that allows the shopper to indicate to the display means 12 that other video representations are to be displayed or that a product is to be more closely examined or ordered, for example. An example of this is to have the control means 14 allow the shopper to interact with the display of one aisle of the grocery store 2 with which a shopping cart image is also displayed. The control means 14 allows the shopper to cause the display means 12 to move the shopping cart down the aisle as if the shopper were pushing it. The control means 14 further allows the shopper to cause the display means 12 to stop at a desired part of the aisle, turn toward that particular part, and zoom in on a particular product. The control means 14 can also allow the shopper to cause the display means 12 to show movement of the selected product off the shelf for closer examination or for moving the displayed representation of the selected product into the represented shopping cart in the same manner as the shopper would actually function in the real grocery store 2. The shopping cart representation is a specific embodiment of a selected product accumulation space. Another embodiment of such a space is a counter in a clothing store where a cash register is located and where the shopper would collect selected clothing items in moving them from the racks of clothing to purchase them. This also provides means for ordering the selected products in that the display means 12 can record the selections and add them to an order list. The control means 14 can provide for eliciting textual, graphical or audible information about the product (e.g., pull-down menus or windows containing the information).

The electronic shopping system shown in FIG. 1 also includes printing means 16 from which one or more selected lists can be printed. This allows the shopper to take the printed list and go to the actual grocery store 2 (or other represented facility) to perform the actual shopping. The present invention also contemplates, however, electronically ordering the selected item so that the facility 2 receives the electronic order, fills it and has the selected items ready for pick up by or delivery to the shopper as desired.

A particular implementation of the system shown in FIG. 1 is illustrated in FIG. 2. A representation of one actual aisle of actual products 4 is digitized using the digital camera 8 referred to above. The digital signals output from the digital camera 8 are provided to a data storage computer 18 embodying the storage means 10 of FIG. 1.

The display means 12 and the control means 4 of FIG. 1 are implemented in FIG. 2 at least in part by one or more local computers 20. A communication link, illustrated in FIG. 2 as the Internet 22, connects the data storage computer 18 with the local computers 20. The data storage computer 18, the one or more local computers 20 and the Internet 22 are used to embody the storage means 10, the display means 12 and the control means 14 of the FIG. 1 embodiment. Particular functions and structures of the system can be implemented in either the data storage computer 18 or the local computer 20 as desired; however, in general, the main data base of digitized signals provided from the digital camera 8 is contained in the central data storage computer 18 and the control means 14 is part of each local computer 20 for the implementation of FIG. 2. The display occurs at the local computer 20, but particular programming to accomplish the functions of the present invention can reside in either the computer 18 or the computer 20 as desired. The computers 18 and 20 are of any suitable known type having enough memory and operating speed to handle the amount of data used in defining the shopping facility and the operations performed therewith. Preferably each computer 20 is a personal computer type or other comparable type readily usable by the shopper, and the computer 18 can be of this type or larger depending upon data handling capability required for a specific implementation. The printers 16 shown in FIG. 2 are of any desired conventional known type compatible with the respective computer 20 (e.g., laser, ink jet, etc.).

The communication link connecting the data storage computer 18 with the local computers 20 can include a telephone line, cellular link, cable television or other connection medium, but in general the local computers 20 will be remote from the data storage computer 18. As mentioned, the particular implementation of FIG. 2 uses the Internet 22 as the communication link. The computer 18 and the computers 20 have suitable known programs to interface with the Internet and communicate over it to achieve the data acquisitions and transfers referred to in this specification.

The programming of the computer 18 and the computers 20 is, in general, known conventional programming which stores data, accesses data, communicates data, manipulates data, and displays data in manners known in the art. One significant aspect of the data handling is, however, that the digitized signals from the digital camera 8 need to be stored in the data storage computer 18 in a manner which allows particular portions of data associated with respective images displayed through the local computer 20 to be identified and independently manipulated. One way to do this is to create links or identifiers with the digitized video data so that it can be located and associated with other information. For example, identifiers can be spatial coordinates of the interior of the grocery store 2. As the data is recorded by the digital camera 8 and stored in the computer 18, the data of a particular portion of the store is associated in the data storage computer 18 memory with a respective x-y-z coordinate. Other identifiers could be manually assigned or otherwise associated by a programmer looking at an image on the screen of the local computer 20 and clicking on areas of products and assigning identifiers to those areas. In whatever manner is chosen, this allows a particular product or other visual segment shown on the screen of a local computer 20 to have a unique identifier to which other information can be associated. For example, this other information can be a set of encoded signals which cause the respective product to flash when it is displayed on the local computer 20 to indicate that that product is being offered at a special price or has been ordered or needs to be reordered. This also allows product information, selector "hot spots" and other features to be associated with respective products. This allows, for example, a hierarchy of classifications to be assigned to each product (e.g., "canned goods," "green beans," "(specific brand name)") to facilitate text-based searching for particular products or types of products. This still further allows for discrete or segmented replacement of data; for example, when a certain product or group of products is changed in the actual store, a corresponding change can be made to the stored signals in the data storage computer 18 by replacing or modifying only that data at the corresponding coordinates in the data base.

With the data entered, linked or tagged as described above, and formatted with appropriate associated information, the shopper at one of the local computers 20 accesses the data storage computer 18 through the local computer and communication link. In the particular implementation, this involves accessing a home page for the grocery store 2 that is also stored in the data storage computer 18. To perform this access, the local computer 20 is turned on, the Internet is accessed by conventional Internet access provider, and the address of the home page is entered (e.g., http://www.abcgrocery.com). A home page 24 such as illustrated in FIG. 3 is then displayed, for example.

Figure 3:
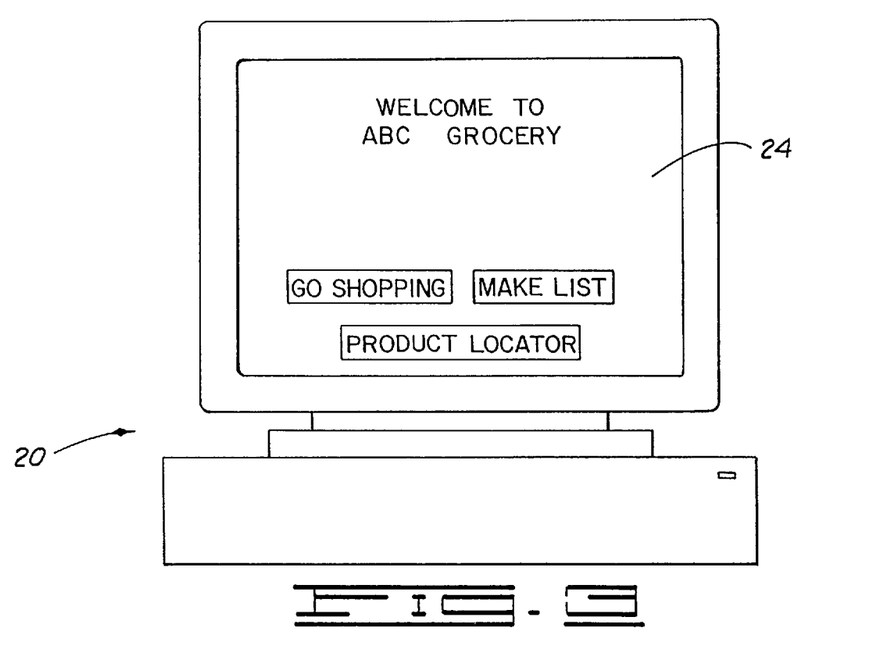
FIG. 3 is a representation of an illustrative screen display at a local computer of the particular implementation of FIG. 2.
Figure 10A:
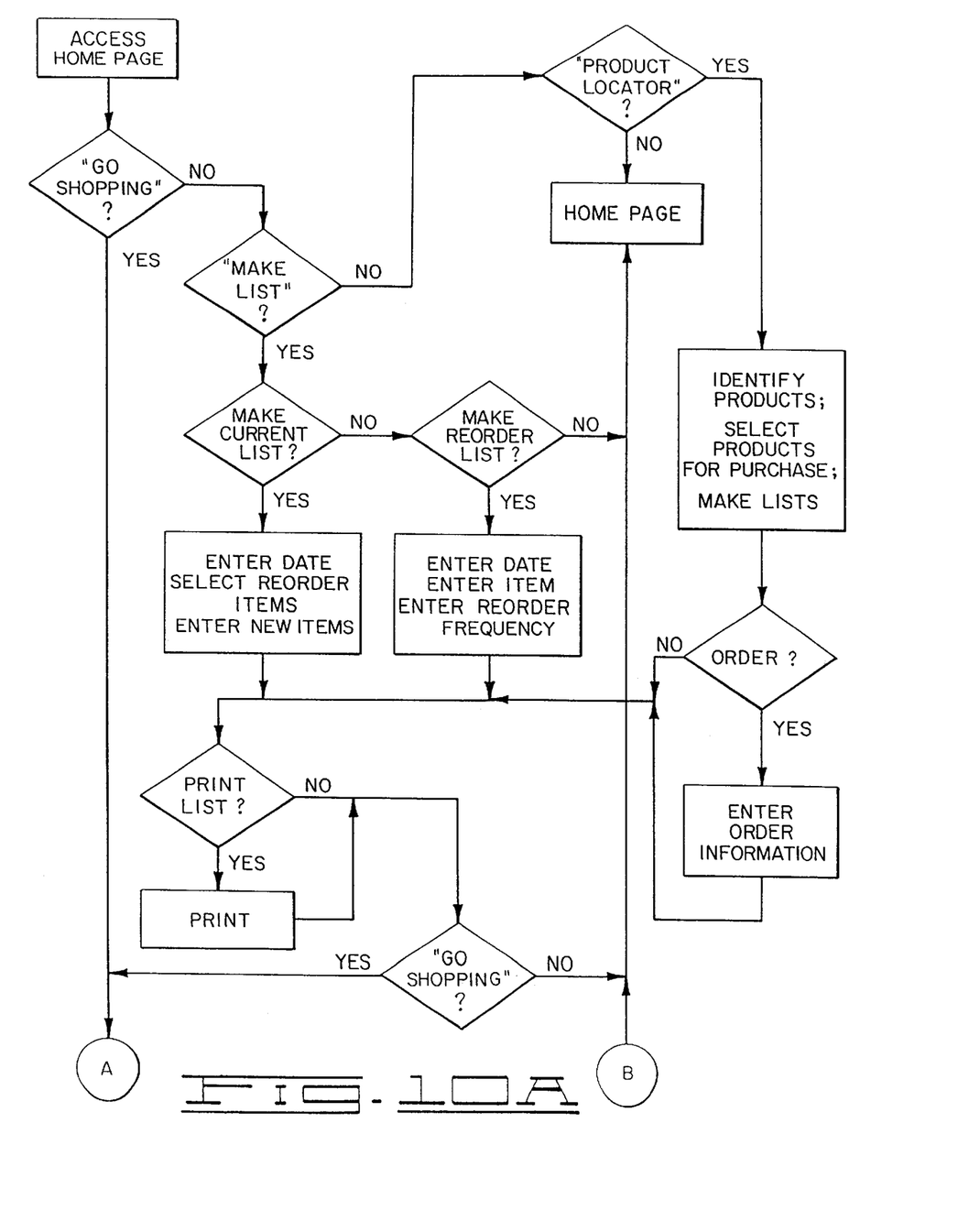
FIGS. 10A–10B show a flow chart of part of the method of the present invention.
Figure 10B:
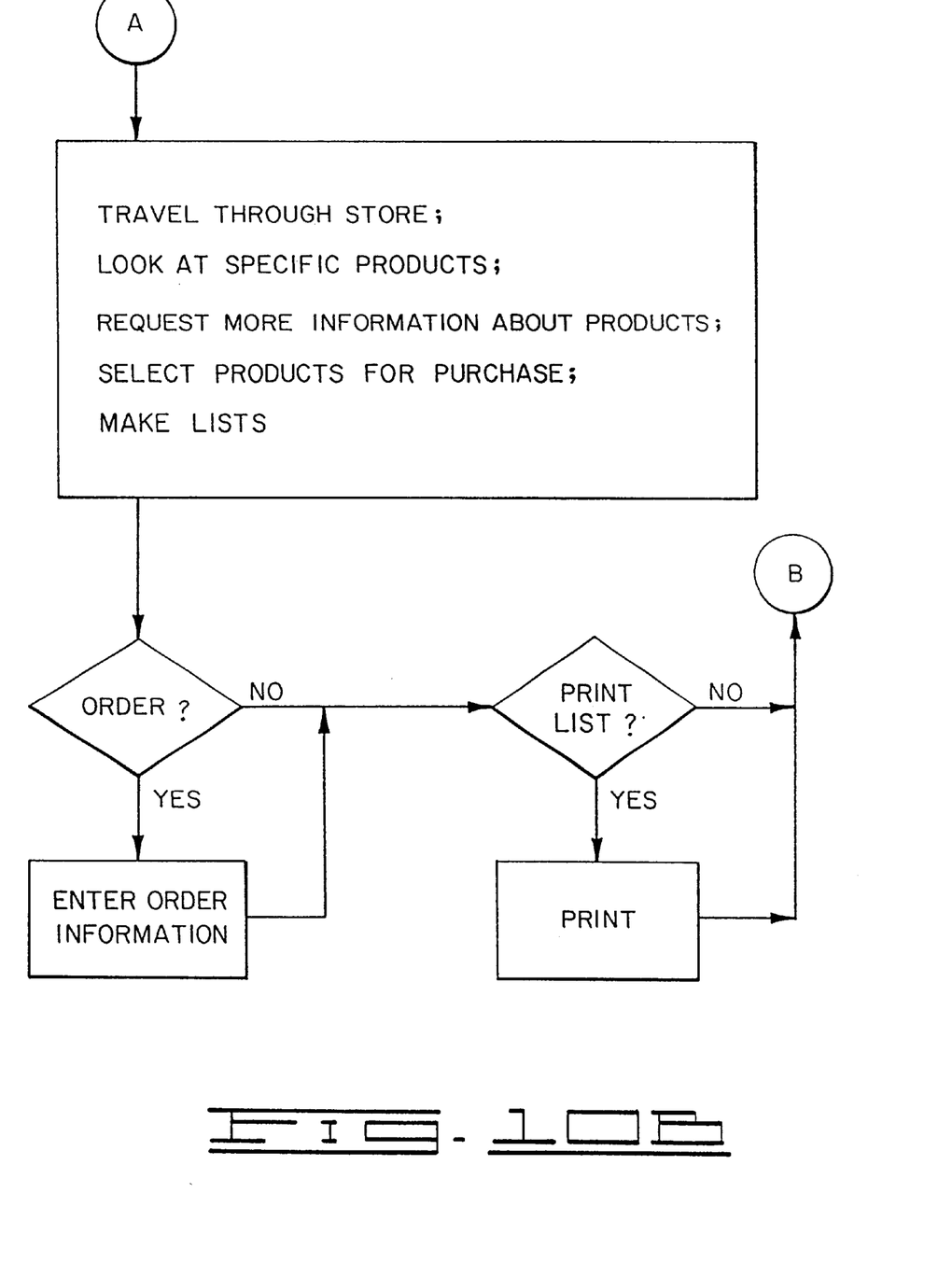

From the home page 24 illustrated in FIG. 3, the shopper can "go shopping" or "make lists" or use a "product locator." These are function selectors designed into the home page which connect the shopper to features of the present invention illustrated in FIGS. 10A–10B.

Referring to FIGS. 10A and 10B, a shopper that "goes shopping" from the home page 24 shown in FIG. 3 can travel through the virtual store, look at specific products, request more information about products, select products for purchase, and make lists. The shopper can also enter order information and print one or more lists.

Figure 4:
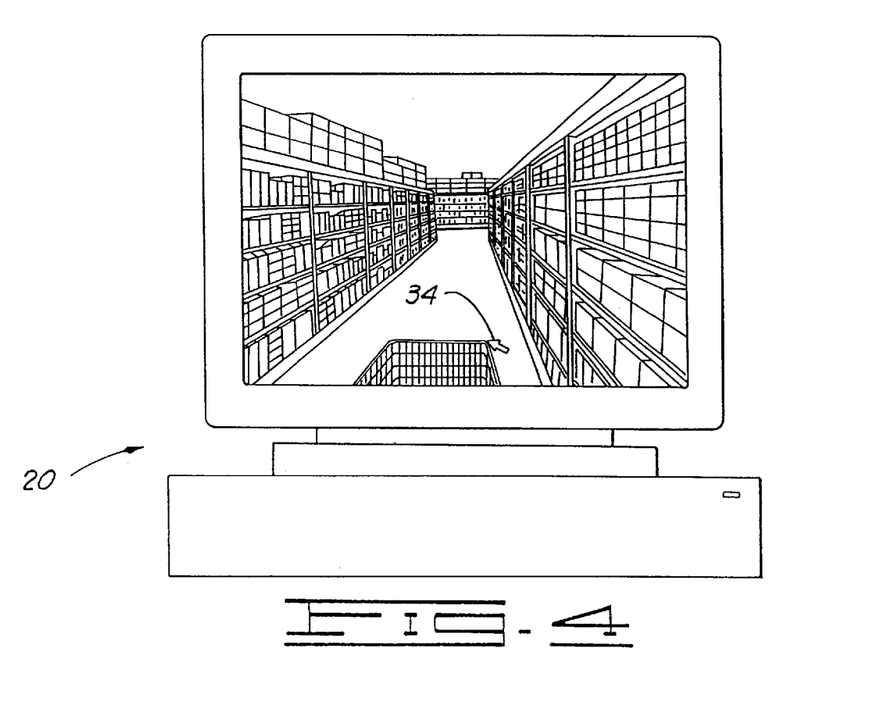
FIG. 4 is a representation of another illustrative screen display at the local computer represented in FIG. 3.
Figure 5:
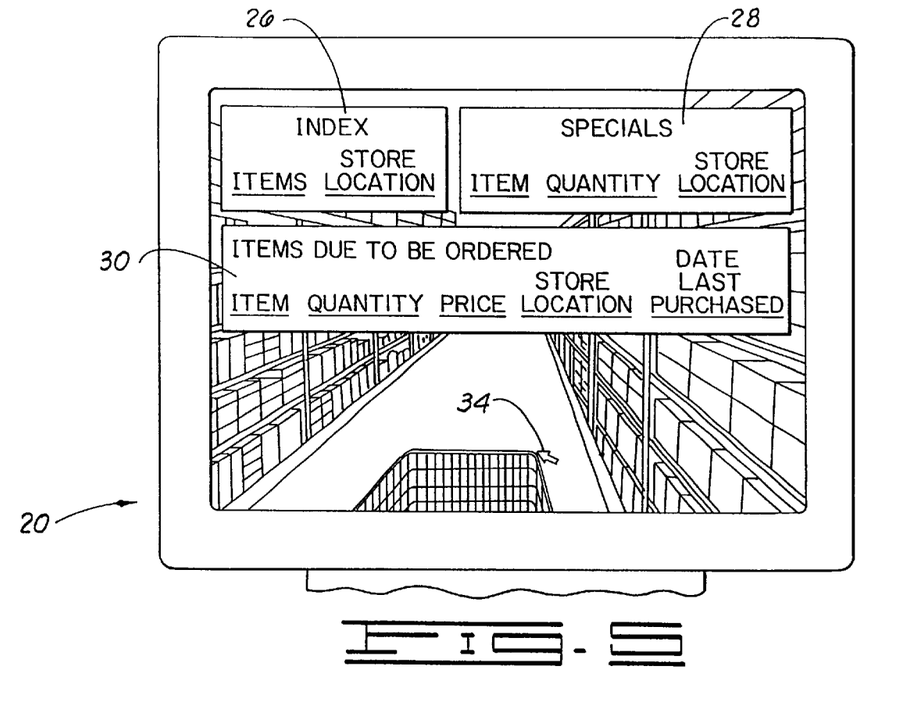
FIGS. 5 and 6 are representations of alternatives for the screen display of FIG. 4.
Figure 6:
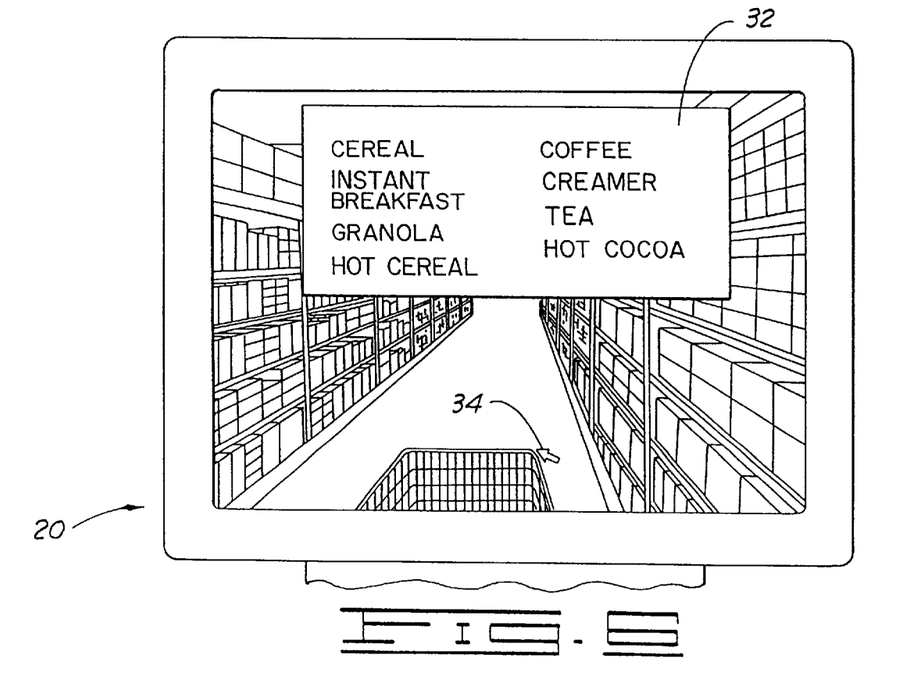

In traveling through the store, the shopper sees the interior of the virtual embodiment of the store as displayed through the respective local computer 20. At the beginning of a travel through the store, the display can show entry through the front door of the store, selection of a shopping cart, and movement to a conventional starting point; however, programming can be used to allow the customer to start at any selected point within the environment of the shopping facility 2. Additionally, programming can allow the shopper to travel down a main aisle and look down each stocked aisle to see images of the products and/or menus of products contained in that aisle. The shopper can then go down each aisle as desired. The beginning of one such stocked aisle is shown in FIG. 4. FIG. 5 shows another type of display of the aisle including an index 26 of the items in the store, a list 28 of items on "special," and a list 30 of items to be ordered based on a predetermined or a calculated frequency. FIG. 6 shows still another type of aisle display, this one including a menu 32 of products available on that aisle.

In general, traveling through the store involves the programming of one or more of the computers 18, 20 to determine the location of the shopper, access data, and display the retrieved data. This involves data transfers between the computer 18 and the respective computer 20 whereby the desired data to be displayed is provided to the local computer 20. One way to determine the location of the shopper in the store is via a cursor 34 displayed on the screen as shown in FIG. 4. This location of the cursor 34 is oriented relative to the computer program defined three-dimensional space coordinate system set up for the shopping facility and providing one means of identifying the digitally recorded images. Once the shopper enters the shopping facility, the computer 18 or 20 keeps track of where the cursor 34 is located within the virtual three-dimensional space and the computer 18 or causes the associated data within a predetermined region of that location to be displayed, again such as illustrated in FIG. 4 (and FIGS. 5 and 6). That is, the computer programming can be defined with preset spatial parameters that define the range of x-y-z coordinates to be shown at any given cursor location. This can be a fixed range, or different ranges depending upon the various positions within each aisle, for example, or as otherwise desired.

Figure 7:
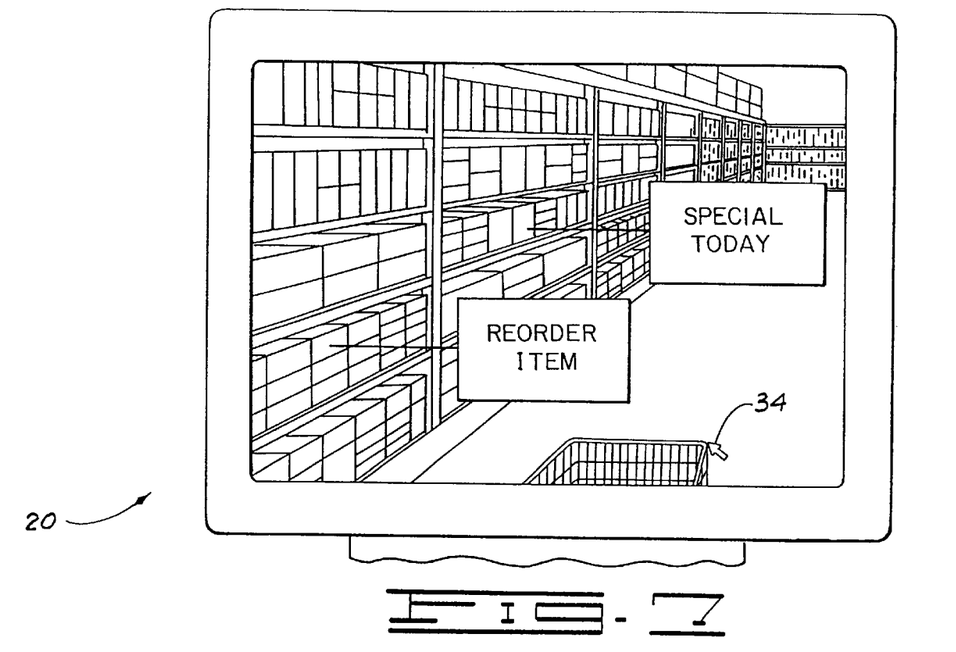
FIG. 7 is a representation of still another illustrative screen display at the local computer represented in FIG. 3.

The present invention also allows for rotational orientation so that if the shopper is in an aisle, looking in a particular direction, the computer 20 displays that view. Such rotational orientation can be implemented using the control means 14 such as specifically implemented by the arrow keys on a keyboard or by a joy stick. Thus, as the shopper travels down the aisle from the end shown in FIG. 4, different data is retrieved from the computer 18 (or from data previously downloaded to the computer 20) to show movement along the aisle as indicated by the scene in FIG. 7. Also shown in FIG. 7 is one technique for identifying to the shopper items to be reordered and on special. Means other than the textual indicators of FIG. 7 can be used; for example, the products can be made to flash or can be highlighted in a predetermined color.

Figure 8:
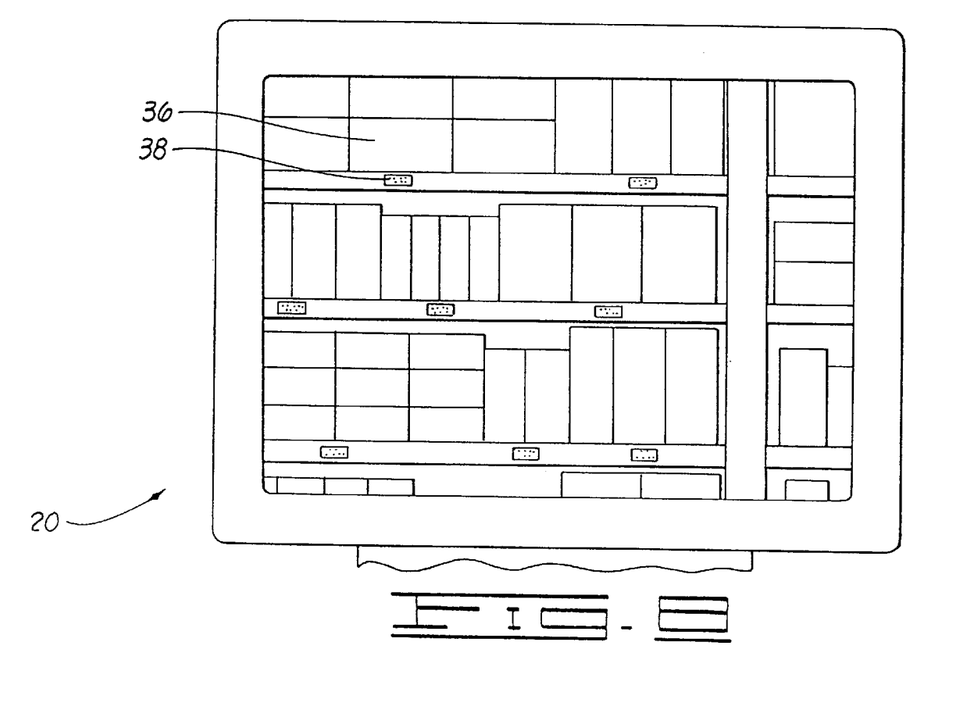
FIG. 8 is a representation of a further illustrative screen display at the local computer represented in FIG. 3.

When the shopper stops at a particular section to look at a product, as indicated by left, right, forward or reverse motion such as input through the arrow keys of the keyboard, a more limited, closer view of a section of the aisle can be viewed, such as shown in FIG. 8. Although not shown in the representation of FIG. 8 due to space and lettering constraints, the individual products, such as product 36, appear on the display means as replicas of the actual products and include their labeling in sufficient definition that the labels can be read in at least close-up views. Associated with each product or group of like products is the corresponding price and information label 38 also in detail for reading in at least close-up views.

An even closer view is shown in FIG. 9 in association with further information about a particular product and lists generated when products are selected. In FIG. 9, for example, each of the shelf labels 38 is a "hot spot" which causes a product information window 40 to be displayed when the cursor 34 is placed on the shelf label "hot spot" and clicked on. As shown in FIG. 9, the information can be visibly shown as in window 40; however, audible information can also be provided if the computer 20 has a speaker and the data from the computer 18 data base contains data for generating audio output. As another example, the product may be graphically presented in response to actuating the "hot spot"; for example, different discrete views of the product can be sequentially shown in maximum close-up views with sufficient resolution and clarity to allow the shopper to read product labeling. These are examples of implementations of the means for communicating information about a selected product and the means by which that selected product is identified.

To obtain data by which the different views shown in FIGS. 4–9 can be provided, the digital camera 8 can be moved throughout the store to capture all of the images and this raw data stored in the computer 18. The computer programming is set up to define specific image ranges within each location of the cursor 34 so that under shopper control of the control means 14, the cursor location within the store can be noted and the images within the appropriate range of that location displayed. As the cursor 34 is moved and other control information given to the computer 18 or 20, movement along an aisle and zoom in and zoom out views can be shown. Alternatively, discrete segments of the store can be stored in the memory and these discrete segments pulled up and displayed as the cursor 34 reaches appropriate locations within the three-dimensional coordinate system set up for the interior of the shopping facility.

As the shopper moves through the virtual store displayed via the computer 20, products can be selected for purchase such as by entering data through the product information window 40 as shown in FIG. 9 (i.e., by selecting "yes" after "purchase") or by single or double clicking on the product or the "hot spot" in a distinctive manner from that used for calling up the product information. A selection can then be automatically added to one or more lists, examples of which are shown in FIG. 9. For example, the lists can be alphabetical (42), by store location (44), or by warehouse location (or other "order fill" location) (46). At least a list such as list 30 also automatically lists the number of items ordered, the unit cost and/or the total for each product, and a running total for the entire list. The programming for the computer 18 or 20 can also allow the shopper to add notes to any of the lists (e.g., an instruction for the person filling the order regarding what to do if a particular selection is not available); entering a note can be by any suitable means of the system, such as by entering text through the keyboard of the computer 20.

Once a list has been created for the products to be purchased, the products can be ordered electronically through the Internet system with instructions for delivery by the store or for pickup by the shopper going to the store. Payment provisions (preferably secure ones) can also be included in the system.

If the shopper wants to go to the store and go through the aisles to select the individual items himself or herself, the desired list can be printed (e.g., by selecting the "print" button on any of lists 42, 44, 46) and taken to the store by the shopper.

Returning to the home page 24 shown in FIG. 3, one or more list forms is displayed at the respective computer 20 if the shopper selects "make list." These can be of the same type shown in FIGS. 5 and 9 and can allow the shopper either to create a current list or to install a reorder list.

Referring to FIG. 10A, to make a current list, the shopper enters the current date, selects any reorder items from an existing reorder list, enters new items to be selected and then controls the computer 20 to automatically organize in the manner the shopper wants (e.g., by location in the store or by price or alphabetically as illustrated in FIG. 9) and print the list if desired. The shopper can then end the session or "go shopping" to see if additional items are needed.

To make a reorder list, the shopper enters the current date, the item to be reordered and information regarding the reorder frequency, and stores the reorder list in memory in either the computer 20 or the computer 18. The list can be printed, and the shopper can then "go shopping" or end the session as desired. An example of a resultant output based on this type of list is shown in FIG. 5 by list 30, which shows items to be reordered as of the current date. Such a list 30 can be defined by the foregoing to have a predetermined order frequency or a list can be automatically maintained based on actual ordering history (e.g., each time an actual order list is made, the historical list updates and determines ordering frequency such as by computing an average time between purchases of the same product).

The third option shown on the home page 24 of FIG. 3 is to use the "product locator." Details of this are shown in FIG. 10A. A predetermined directory of all the products available from the store 2 is encoded in digital signals stored in the computer data base of the system such that this directory is searchable by one or more words entered into the computer 20 by the shopper (or other selection technique, e.g., an alphabetical list the shopper scrolls through). The programmed computer 20 with its keyboard (for example) provide means for enabling the shopper to search the defined searchable directory in that the shopper types in one or more words to identify the product to be located (e.g., "green beans"). The system then matches this to the stored directory listing and retrieves and displays back to the shopper through the screen of the computer 20 where the product is located in the store 2. This can be by a text response (e.g., "aisle 2") or by displaying the video image of that portion of the store as would be seen if the shopper moved among the virtual aisles. The shopper can select these found items, make one or more lists, and order if desired, all as indicated in the flow chart of FIG. 10A. The shopper then can print the list(s), "go shopping," or return to the home page 24, also as shown in FIG. 10A. Other specific implementations can, of course, be used.

The foregoing defines the preferred embodiment of a computer-implemented method of simulating movement of a shopper through a shopping facility to enable the individual to observe, inspect and select a product in the shopping facility through operation of a computer. Stated another way, this is a method of creating a virtual shopping facility for interactive shopping by computer.

Based on the system described above, this method comprises selecting a physically embodied shopping facility having displays of goods physically disposed therein for the particular implementation of a grocery store, for example. The selected shopping facility has a known configuration via its actual construction and arrangement of products displayed at the selected shopping facility such that a shopper can move among the displayed products to observe, inspect and select from among the displayed products.

The method simulates the configuration of the displayed products in a computer, such as one of the computers 18 or 20. This includes in the illustrated implementation translating the known configuration of displayed products into encoded configuration-defining electric signals in memory of the computer 18 and using the electric signals to create video representations of the configuration of displayed products through the computer 20 (in another non-limiting example, the signals can be stored on a storage medium used directly in the computer 20). Conversion of the images of the physically disposed displays of goods into encoded digital signals is by means of the digital camera 8 for the particular implementation of FIG. 2. The encoded digital signals from the camera 8 are stored in the computer 18 in this implementation. Access is provided to these stored signals such that portions of the signals are selectable and transmissible to the computer 20 for displaying, on a monitor of that computer, virtual movement along the display of goods represented by selected stored encoded digital signals. In the illustrated implementation this uses known Internet communication technology for accessing and transferring the requisite signals.

The shopper using the system and method of the present invention is located at a respective one of the computers 20 and indicates to that computer 20 a first virtual position of the shopper within the displayed shopping facility. This first position is indicated by the shopper controlling the control means 14, such as a mouse, to place the cursor 34 at a desired location within the displayed video representation of the configuration of displayed products.

The shopper indicates to the computer a continuous change from the first position to a second position. This can be done by moving the cursor 34 along the displayed image. In response the stored data within the predetermined display range of the cursor location is acquired to continuously change the displayed images resulting in displaying through the monitor of the computer 20 a changing video representation of the configuration of displayed products corresponding to a moving scene the shopper would see in moving from the first position to the second position in the actual shopping facility.

The method of the present invention also includes distinctively displaying predetermined ones of displayed products to indicate to the shopper that the distinctively displayed products are offered on a special basis or need to be reordered or are on the current order list, for example.

The method also includes indicating to the computer the shopper's selection of a specific product. This can be by, for example, clicking on the displayed product, or clicking on the displayed product and dragging it to a video representation of a shopping cart, or answering a selection query in a display window on the screen. Selection can also be by a light pen, screen touch, keyboard actuation or other means. When a product is selected, it is automatically added to the selected product list.

The invention also includes maintaining in the computer a historical list of products selected by the shopper.

From the product selections, a list is created in the computer 18 or 20, which list contains the products to be purchased by the shopper at the actual selected shopping facility. The list can be organized in a sequential order in which the selected products are to be picked up at the actual selected shopping facility or at another location such as a warehouse where electronically transmitted orders are filled. Other list organizations can be used.

When the list has been completed, it can be printed for the shopper to use when the shopper goes to the actual selected shopping facility, for example.

As mentioned above, the hardware and software for implementing the system and method described above are in general conventional and known in the art. To the extent any modifications or additional hardware or software is needed in specifically implementing the invention, such modifications and additions are within the skill in the art given the explanation of the invention set forth above.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A food vending method, comprising:

maintaining an actual operating food vendor at a physical location, the food vendor having a customer service area;

converting at the customer service area actual images of the customer service area and food served therein into encoded digital signals;

storing the encoded digital signals in a computer storage medium; and providing for remote computer communication link access to the stored encoded digital signals such that transmissions over the communication link responsive to the stored encoded digital signals display on a monitor of a computer at a location remote from the physical location of the food vendor a continuous motion visual representation of movement and food within the customer service area enabling a person viewing the monitor to have a visual experience of walking in the customer service area of the actual operating food vendor, sitting down at a table, and opening a menu as if the person were in the physical location of the actual operating food vendor.

2. A method as defined in claim 1, wherein:

converting actual images of the customer service area includes converting an actual image of a menu used in the customer service area; and the continuous motion visual representation includes the actual image of the menu.

3. A method as defined in claim 2, wherein the food represented in the continuous motion visual representation appears in response to selecting at the computer the respective food item from the actual image of the menu in the continuous motion visual representation.

4. A method as defined in claim 2, further comprising transmitting an order for food from the computer to the food vendor over the communication link.

5. A method as defined in claim 3, further comprising transmitting an order for food from the computer to the food vendor over the communication link.

6. A method as defined in claim 3, wherein the selected food representation appears in continuous motion showing the selected food being served at the table.

7. A method as defined in claim 1, wherein the continuous motion visual representation further enables the person viewing the monitor to have a further visual experience of seeing a food item being served to the displayed table after the person has selected the food item from the opened menu.

* * * * *